United States Patent
Ozaki et al.

(10) Patent No.: US 8,032,796 B2
(45) Date of Patent: Oct. 4, 2011

(54) MONITORING APPARATUS AND METHOD OF MONITORING BY A CARRIER

(75) Inventors: Yoshinori Ozaki, Kawasaki (JP); Satoshi Kumano, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 260 days.

(21) Appl. No.: 12/408,033

(22) Filed: Mar. 20, 2009

(65) Prior Publication Data

US 2009/0307539 A1    Dec. 10, 2009

(30) Foreign Application Priority Data

Jun. 9, 2008   (JP) ................................. 2008-150741

(51) Int. Cl.
  *G06F 11/00*   (2006.01)
(52) U.S. Cl. .......................................................... 714/43
(58) Field of Classification Search ................... 714/43, 714/57

See application file for complete search history.

(56) References Cited

U.S. PATENT DOCUMENTS

| | | | |
|---|---|---|---|
| 6,694,455 B1 * | 2/2004 | Scrandis et al. ................ 714/31 |
| 7,197,546 B1 * | 3/2007 | Bagga et al. ................... 709/223 |
| 7,512,841 B2 * | 3/2009 | Walker et al. ................... 714/43 |
| 2005/0172160 A1 * | 8/2005 | Taylor et al. ....................... 714/4 |
| 2005/0201274 A1 * | 9/2005 | Guerin et al. ................. 370/217 |
| 2005/0220030 A1 | 10/2005 | Nagami et al. |
| 2007/0053283 A1 * | 3/2007 | Bidwell et al. ................ 370/216 |
| 2007/0263649 A1 * | 11/2007 | Cuni et al. ..................... 370/412 |
| 2008/0114874 A1 * | 5/2008 | Meir et al. ...................... 709/224 |

FOREIGN PATENT DOCUMENTS

| | | |
|---|---|---|
| JP | 8-328979 | 12/1996 |
| JP | 2005-286818 | 10/2005 |

\* cited by examiner

*Primary Examiner* — Scott Baderman
*Assistant Examiner* — Yair Leibovich
(74) *Attorney, Agent, or Firm* — Fujitsu Patent Center

(57) ABSTRACT

A monitoring apparatus of a carrier is disclosed that includes a managing part that assigns a related carrier path ID to network configuration information and manages the related carrier path ID, the related carrier path ID uniquely defining a path span between the carrier and a related carrier; a receiving part that receives alarm information from a communications apparatus in the carrier, a selecting part that selects main cause alarm information from the alarm information; a determining part that determines whether the main cause alarm information affects the related carrier by determining whether the related carrier path ID is assigned to corresponding network configuration information in the main cause alarm information; and a transmitting part that transmits the main cause alarm information including the related carrier path ID and a generation location to the related carrier where the main cause alarm information is determined to affect the related carrier.

12 Claims, 20 Drawing Sheets

FIG.3A

[ALARM INFORMATION OF OPS#1 OF CARRIER X]

| GENERATING LOCATION | GENERATING APPARATUS | PHYSICAL LOCATION | ALARM TYPE |
|---|---|---|---|
| PATH#1 | NE#1 | 1-1-1 | AIS |
| SECTION B | NE#2 | 2-1 | AIS |
| SECTION B | NE#3 | 1-1 | LOS |

[ALARM INFORMATION OF OPS#2 OF CARRIER Y]

| GENERATING LOCATION | GENERATING APPARATUS | PHYSICAL LOCATION | ALARM TYPE |
|---|---|---|---|
| PATH#1 | NE#5 | 1-1-1 | AIS |

FIG.3B

[ALARM INFORMATION OF OPS#1 OF CARRIER X] & [ALARM INFORMATION OF OPS#2 OF CARRIER Y]

| CARRIER INFORMATION | GENERATING LOCATION | GENERATING APPARATUS | PHYSICAL LOCATION | ALARM TYPE |
|---|---|---|---|---|
| CARRIER A | PATH#1 | NE#1 | 1-1-1 | AIS |
| CARRIER A | SECTION B | NE#2 | 2-1 | AIS |
| CARRIER A | SECTION B | NE#3 | 1-1 | LOS |
| CARRIER B | PATH#1 | NE#5 | 1-1-1 | AIS |

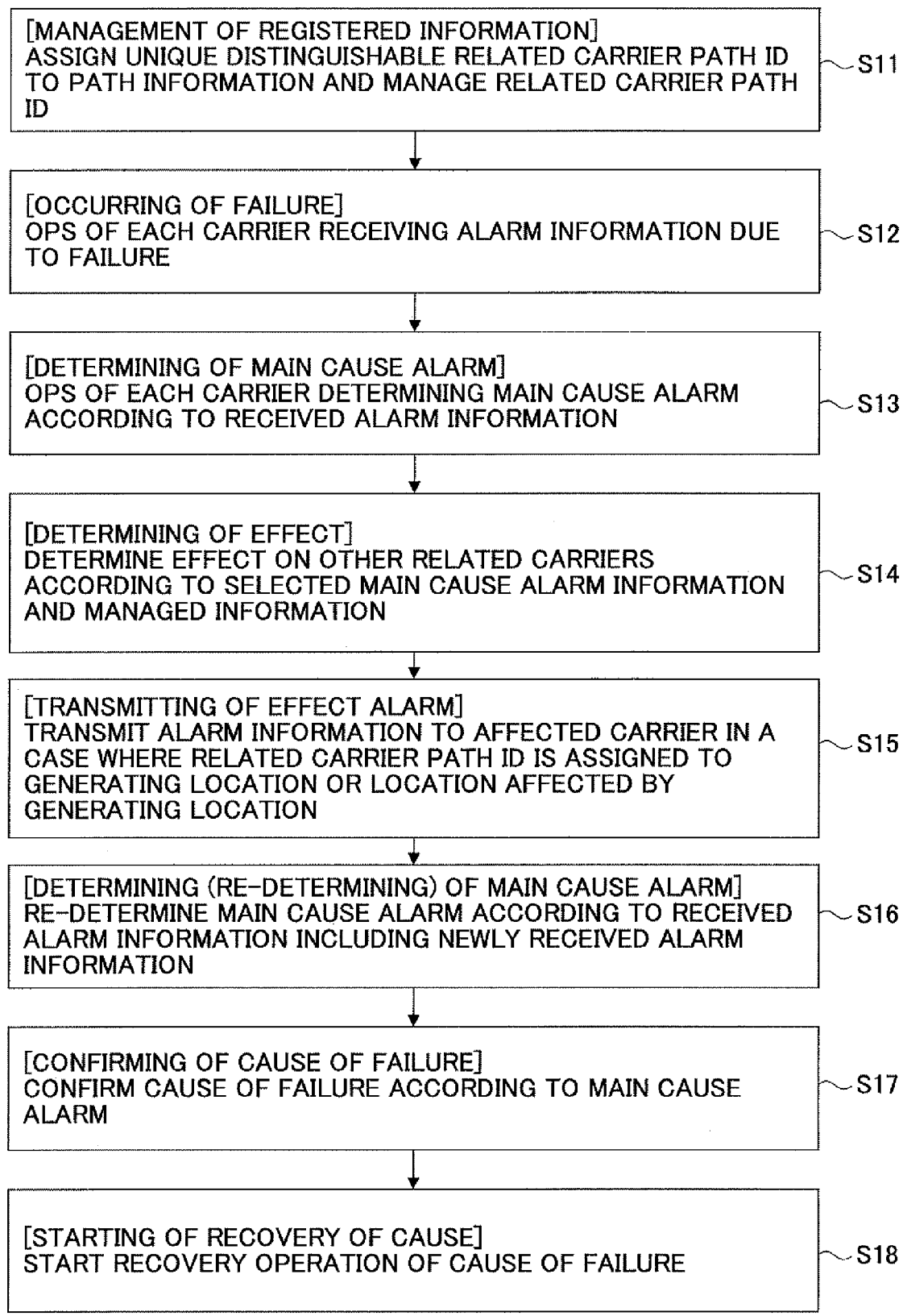

FIG.6A

[NETWORK MANAGEMENT INFORMATION OF OPS#1 OF CARRIER X]

● SECTION INFORMATION

| ID | SECTION NAME | TERMINAL APPARATUS 1 | PHYSICAL LOCATION 1 | TERMINAL APPARATUS 2 | PHYSICAL LOCATION 2 |
|----|---|---|---|---|---|
| 1 | SECTION A | NE#1 | 1-1 | NE#2 | 1-1 |
| 2 | SECTION B | NE#2 | 2-1 | NE#3 | 1-1 |
| 3 | SECTION C | NE#3 | 2-1 | NE#OTHER | - |
| .. | .. | .. | .. | .. | .. |

● PATH INFORMATION

| ID | PATH NAME | TERMINAL APPARATUS 1 | PHYSICAL LOCATION 1 | TERMINAL APPARATUS 2 | PHYSICAL LOCATION 2 | SECTION ID | CH | ... | SECTION ID | CH | RELATED CARRIER PATH ID |
|----|---|---|---|---|---|---|---|---|---|---|---|
| 1 | PATH#1 | NE#1 | 1-1-1 | NE#OTHER | - | 1 | 10 | ... | 3 | 10 | 001 |
| .. | .. | .. | .. | .. | .. | .. | .. | ... | .. | .. | .. |

[NETWORK MANAGEMENT INFORMATION OF OPS#2 OF CARRIER Y]

● SECTION INFORMATION

| ID | SECTION NAME | TERMINAL APPARATUS 1 | PHYSICAL LOCATION 1 | TERMINAL APPARATUS 2 | PHYSICAL LOCATION 2 |
|----|---|---|---|---|---|
| 1 | SECTION D | NE#4 | 2-1 | NE#5 | 1-1 |
| 2 | SECTION C | NE#OTHER | - | NE#4 | 1-1 |
| 3 | SECTION E | NE#5 | 2-1 | NE#6 | 1-1 |
| .. | .. | .. | .. | .. | .. |

● PATH INFORMATION

| ID | PATH NAME | TERMINAL APPARATUS 1 | PHYSICAL LOCATION 1 | TERMINAL APPARATUS 2 | PHYSICAL LOCATION 2 | SECTION ID | CH | ... | SECTION ID | CH | RELATED CARRIER PATH ID |
|----|---|---|---|---|---|---|---|---|---|---|---|
| 1 | PATH#1 | NE#OTHER | - | NE#5 | 1-1-1 | 2 | 10 | ... | 1 | 10 | 001 |
| 2 | PATH#2 | NE#5 | 1-2-1 | NE#6 | 1-1-1 | 3 | 20 | ... | - | 20 | - |
| .. | .. | .. | .. | .. | .. | .. | .. | ... | .. | .. | .. |

FIG.6B

[RELATED CARRIER INFORMATION OF OPS#1 OF CARRIER X]

| RELATED CARRIER PATH ID | RELATED CARRIER 1 | TRANSMISSION DESTINATION 1 | RELATED CARRIER 2 | TRANSMISSION DESTINATION 2 |
|---|---|---|---|---|
| 001 | RELATED CARRIER Y | xx.xx.xx.xx | — | — |
| .. | .. | .. | .. | .. |

[RELATED CARRIER INFORMATION OF OPS#2 OF CARRIER Y]

| RELATED CARRIER PATH ID | RELATED CARRIER 1 | TRANSMISSION DESTINATION 1 | RELATED CARRIER 2 | TRANSMISSION DESTINATION 2 |
|---|---|---|---|---|
| 001 | RELATED CARRIER X | xx.xx.xx.xx | — | — |
| .. | .. | .. | .. | .. |

FIG.7A

[ALARM INFORMATION OF OPS#1 OF CARRIER X]

| GENERATING LOCATION | GENERATING APPARATUS | PHYSICAL LOCATION | ALARM TYPE |
|---|---|---|---|
| PATH#1 | NE#1 | 1-1-1 | AIS |
| SECTION B | NE#2 | 2-1 | AIS |
| SECTION B | NE#3 | 1-1 | LOS |

FIG.7B

[ALARM INFORMATION OF OPS#2 OF CARRIER Y]

| GENERATING LOCATION | GENERATING APPARATUS | PHYSICAL LOCATION | ALARM TYPE |
|---|---|---|---|
| PATH#1 | NE#5 | 1-1-1 | AIS |

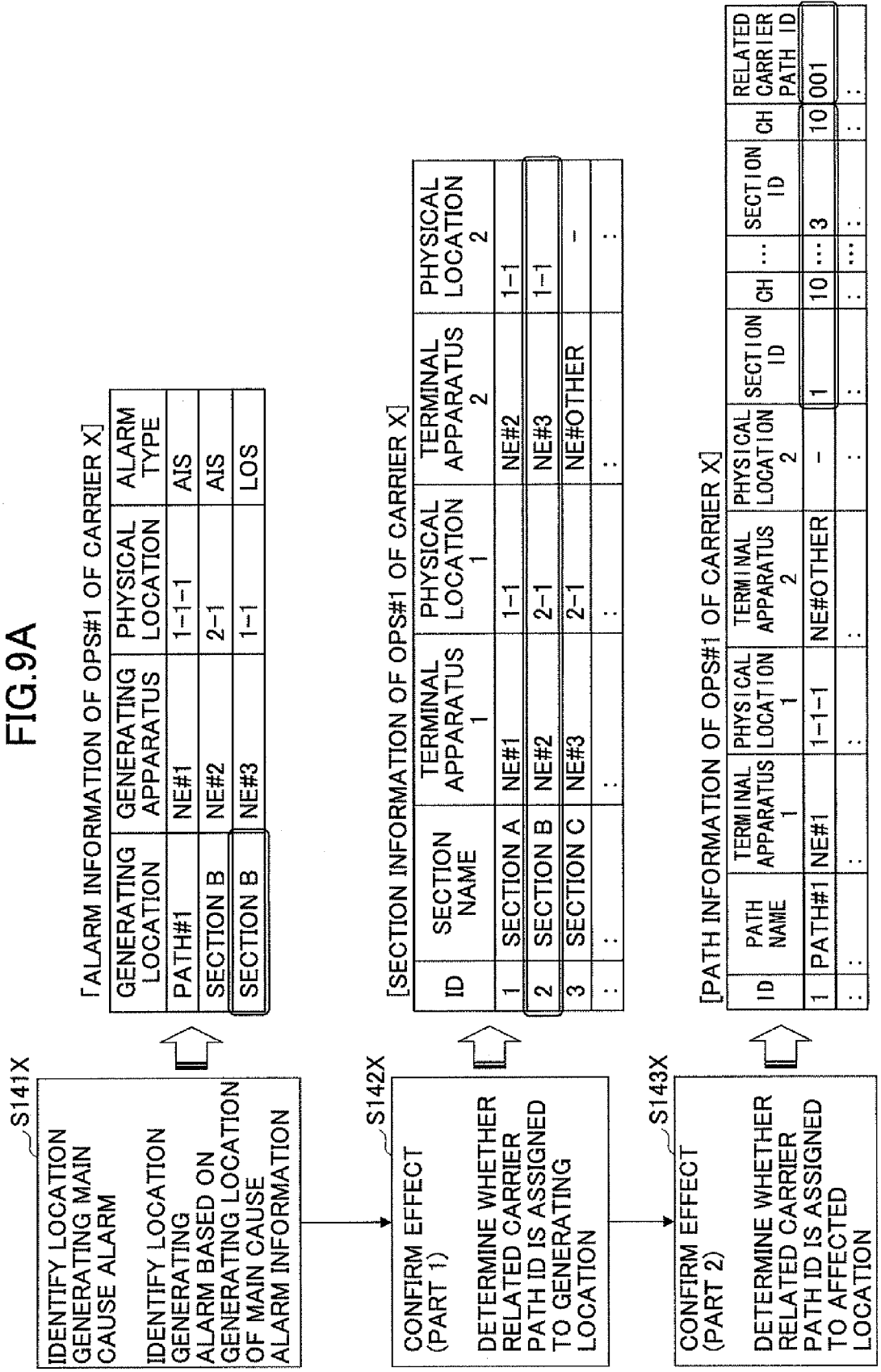

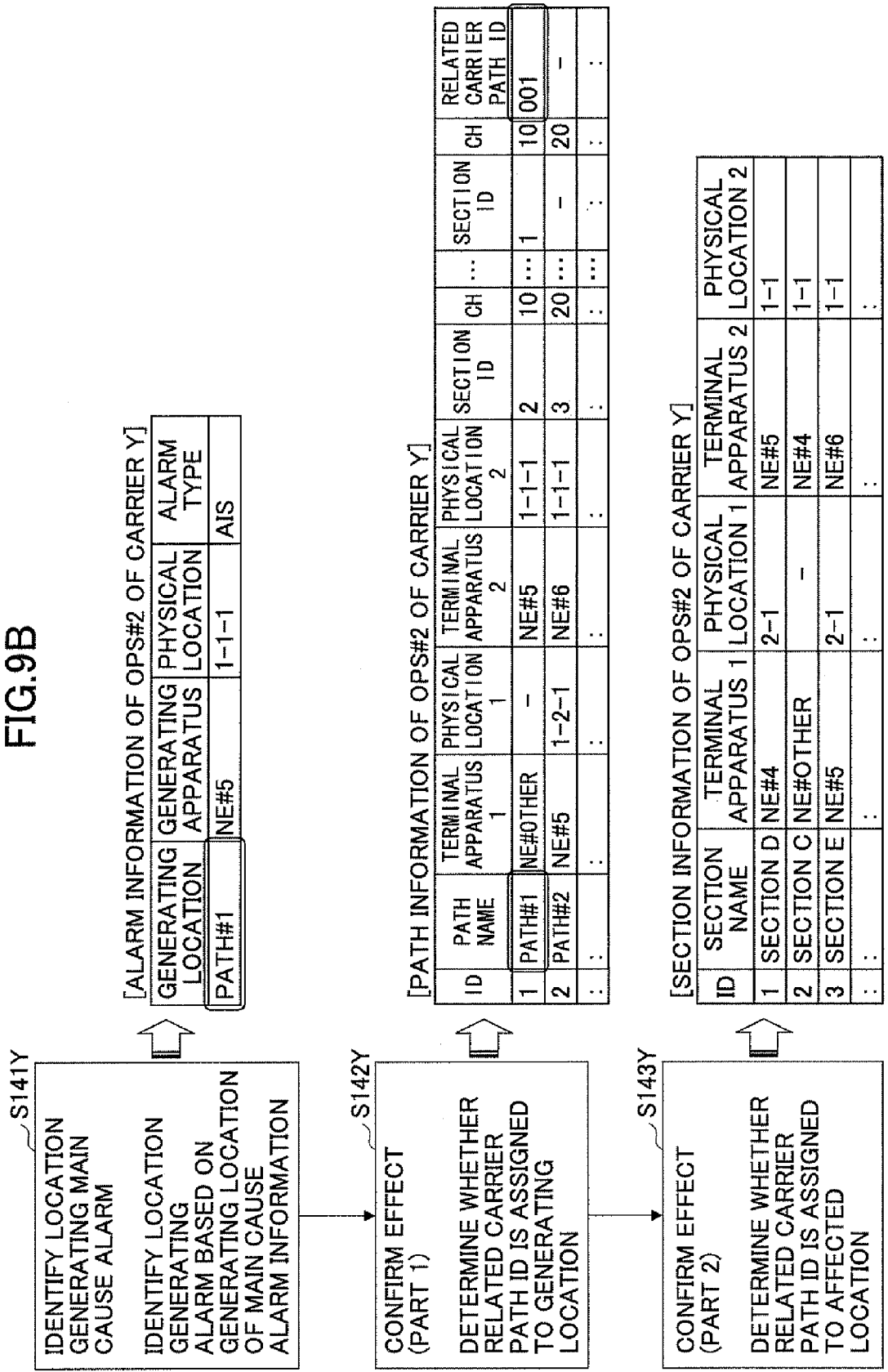

FIG.10A

[INFORMATION TRANSMITTED FROM OPS#1 TO OPS#2]

| GENERATING LAYER | ALARM TYPE | RELATED CARRIER PATH ID |
|---|---|---|
| SECTION | LOS | 001 |

[INFORMATION TRANSMITTED FROM OPS#2 TO OPS#1]

| GENERATING LAYER | ALARM TYPE | RELATED CARRIER PATH ID |
|---|---|---|
| PATH | AIS | 001 |

FIG.10B

[ALARM INFORMATION OF OPS#1 OF CARRIER X]

| GENERATING LOCATION | GENERATING APPARATUS | PHYSICAL LOCATION | ALARM TYPE |
|---|---|---|---|
| PATH#1 | NE#1 | 1-1-1 | AIS |
| SECTION B | NE#2 | 2-1 | AIS |
| SECTION B | NE#3 | 1-1 | LOS |
| PATH | OTHER APPARATUS | - | AIS |

[ALARM INFORMATION OF OPS#2 OF CARRIER Y]

| GENERATING LOCATION | GENERATING APPARATUS | PHYSICAL LOCATION | ALARM TYPE |
|---|---|---|---|
| PATH#1 | NE#5 | 1-1-1 | AIS |
| SECTION | OTHER APPARATUS | - | LOS |

[MAIN CAUSE ALARM INFORMATION OF OPS#1 OF CARRIER X]

| GENERATING LOCATION | GENERATING APPARATUS | PHYSICAL LOCATION | ALARM TYPE |
|---|---|---|---|
| SECTION B | NE#3 | 1-1 | LOS |

CONFIRM THAT THE CAUSE OF FAILURE IS NE#3 OF SECTION B INSIDE CARRIER ITSELF

FIG.12B

[MAIN CAUSE ALARM INFORMATION OF OPS#2 OF CARRIER Y]

| GENERATING LOCATION | GENERATING APPARATUS | PHYSICAL LOCATION | ALARM TYPE |
|---|---|---|---|
| SECTION | OTHER APPARATUS | - | LOS |

CONFIRM THAT THE CAUSE OF FAILURE IS SECTION INFORMATION INSIDE CARRIER X

MONITORING APPARATUS AND METHOD OF MONITORING BY A CARRIER

CROSS-REFERENCE TO RELATED APPLICATIONS

This application is based upon and claims the benefit of priority of the prior Japanese Patent Application No. 2008-150741 filed on Jun. 9, 2008, the entire contents of which are incorporated herein by reference.

FIELD

The embodiments discussed herein are related to a technology for monitoring failure in an environment where services are provided by one or more lines connected between plural different carriers.

BACKGROUND

Description of the Related Art

Currently, plural different carriers are connected with one or more lines for providing an increasing number of services to users through paths (services) span across the plural different carriers.

However, networks for monitoring failures are separately built with respect to each carrier. Naturally, a monitoring apparatus such as an OPS (Operation System) is established with respect to each carrier. There is no automatic exchanging of alarm information among the carriers. One reason for not automatically exchanging alarm information is because path information of one carrier cannot be disclosed to another carrier from the aspect of maintaining confidentiality.

In a case where a failure occurs in a path span across plural carriers, the monitoring apparatus receives alarm information from a communications apparatus NE (Network Element) located on the path. In such a case, the carrier encountering the failure is to report the failure to other carriers and promptly take necessary action.

In such a case, each carrier is to determine whether its monitoring apparatus has received alarm information due to a failure within the carrier itself or received alarm information due to a failure from another carrier (secondary alarm information). Therefore, in a case where such a failure occurs, a carrier needs to confirm what occurred by communicating with other related carriers in order to find the cause of the failure and to resolve the failure.

FIG. 1 is a schematic diagram for describing a path span across plural carriers. In FIG. 1, a carrier X includes communications apparatuses NE#1-3 and a monitoring apparatus OPS#1, and another carrier Y includes communications apparatuses NE#4-6 and a monitoring apparatus OPS#2. Further, a section A is provided between the communications apparatuses NE#1 and NE#2; a section B is provided between the communications apparatuses NE#2 and NE#3; a section C is provided between the communications apparatuses NE#3 and NE#4; and a section D is provided between the communications apparatuses NE#4 and NE#5. The sections A-D form a path #1. Accordingly, the path #1 spans between the carriers X and Y. Further, a section E is provided between the communications apparatuses NE#5 and NE#6. The section E forms a path #2. In this example, the path #2 does not span between the carriers X and Y, but is provided (closed) in the carrier Y.

Next, procedures in responding to a failure occurring in the path #1 of section B of the carrier X are described with reference to FIGS. 1-3.

FIG. 2 is a flowchart illustrating procedures of responding to a failure according to a related art example.

In a case where a failure occurs in the section B of the carrier X, the monitoring apparatuses OPS#1, OPS#2 of the carriers X, Y receive alarm information due to the failure (Step S1). FIG. 3A illustrates an example of the alarm information received by the monitoring apparatuses OPS#1, OPS#2. The alarm information received by the monitoring apparatus OPS#1 of the carrier X includes information indicative of, for example, generating location: path #1, generating apparatus (i.e. apparatus generating the alarm information): NE#1, physical location: 1-1-1, alarm type: AIS (Alarm Indication Signal), occurring location: section B, generating apparatus: NE#2, physical location: 2-1, alarm type: AIS, occurring location: section B, generating apparatus: NE#3, physical location: 1-1, and alarm type: LOS (Loss Of Signal). The alarm information received by the monitoring apparatus OPS#2 of the carrier Y includes information indicative of, for example, occurring location: path #1, generating apparatus: NE#5, physical location: 1-1-1, and alarm type: AIS. In this embodiment, the alarm type AIS is an alarm indicating that an AIS signal has been transmitted for informing a downstream terminal point(s) and connection point(s) that an alarm has been emitted due to a failure detected upstream. Further, the alarm type LOS is an alarm indicating that a signal has been lost based on consecutive zeros detected from incoming signals.

Returning to FIG. 2, each of the carriers X, Y analyzes the cause of the failure based on the alarm information received by its corresponding monitoring apparatuses OPS#1, OPS#2 (Step S2).

For example, according to the alarm information received by the monitoring apparatus OPS#1, the carrier X recognizes that:
i) an abnormality is occurring in the path #1;
ii) an abnormality is occurring in the section B which is the upper level layer of the path #1; and
iii) it is anticipated that the abnormality of the communications apparatus NE#3 of the section B is the cause of the failure.

However, the carrier X is unable to recognize:
i) Is the abnormality of the communications apparatus NE#3 of the section B really the cause of the failure?;
ii) Could it be an alarm due to a failure in another carrier(s) existing on the path #1;
iii) Is the failure affecting the other carrier(s) existing on the path #1; and
iv) How much has the failure affected the other carrier(s) existing on the path #1.

Meanwhile, according to the alarm information received by the monitoring apparatus OPS#2, the carrier Y recognizes that:
i) an abnormality is occurring in the path #1; and
ii) it is anticipated that the carrier Y itself is not the cause of the failure since information other than the abnormality of the path #1 cannot be obtained.

However, the carrier Y is unable to recognize:
i) Is the carrier Y itself really not the cause of the failure?;
ii) Where is the carrier encountering the cause of the failure?;
iii) What is the content of the cause of the failure?;
iv) Is the failure affecting the other carrier(s) existing on the path #1;
v) How much has the failure affected the other carrier(s) existing on the path #1.

Thus, since determination (judgment) cannot be made only by relying on alarm information of a carrier itself, the carrier makes confirmation by directly exchanging information with another carrier(s) (Step S3). For example, an administrator of the carrier exchanges alarm information (shown in FIG. 3) with an administrator of another carrier by telephone. It is to be noted that, since the information regarding the generating apparatus and the physical location are managed by each carrier, the fact that such information is included in the exchanged information has little significance.

Returning to FIG. 2, each of the carriers X, Y investigates the cause of the failure based on the confirmed exchanged information (Step S4). FIG. 3B illustrates an example of alarm information combined by the exchanging of information.

The carrier X determines that:
i) the cause of the failure is the communications apparatus NE#3 of the section B inside the carrier X itself; and
ii) the failure had affected the carrier Y existing on the path #1.

The carrier Y determines that:
i) the cause of the failure was not the carrier Y itself; and
ii) an alarm was generated by the effect of the failure occurring in the carrier X.

Returning to FIG. 2, each of the carriers X, Y starts a recovery operation according to the identified (determined) cause of the failure (Step S5).

Japanese Laid-Open Patent Publication No. 2005-286818 discloses a network monitoring tool capable of appropriately grasping the setting status of a label switch path of a network. Further, Japanese Laid-Open Patent Publication No. 8-328979 discloses a failure managing method capable of concentrated remote management of failure without requiring any human labor even in a complicated system span across plural networks. However, these references do not take into consideration a case of handling a failure in a path span across plural different carriers.

SUMMARY

According to an aspect of the invention, there is provided a monitoring apparatus of a carrier, the monitoring apparatus including: a managing part that assigns a related carrier path ID to network configuration information and manages the related carrier path ID, the related carrier path ID uniquely defining a path spanning between the carrier and a related carrier; a receiving part that receives alarm information from a communications apparatus in the carrier; a selecting part that selects main cause alarm information from the alarm information; a determining part that determines whether the main cause alarm information affects the related carrier by determining whether the related carrier path ID is assigned to corresponding network configuration information in the main cause alarm information; and a transmitting part that transmits the main cause alarm information including the related carrier path ID and a generating location to the related carrier where the main cause alarm information is determined to affect the related carrier.

The object and advantages of the invention will be realized and attained by means of the elements and combinations particularly pointed out in the claims.

It is to be understood that both the foregoing generation description and the followed detailed description are exemplary and explanatory and are not restrictive of the invention, as claimed.

BRIEF DESCRIPTION OF DRAWINGS

FIGS. 3A and 3B are schematic diagrams illustrating examples of alarm information;

FIG. 5 is a flowchart illustrating an example of an operation performed by monitoring apparatuses according to an embodiment of the present invention;

FIG. 6A is a schematic diagram illustrating an example of a network configuration information database according to an embodiment of the present invention;

FIG. 6B is a schematic diagram illustrating an example of a related carrier information database according to an embodiment of the present invention;

FIG. 7A is a schematic diagram illustrating an example of alarm information received when a failure occurs according to an embodiment of the present invention;

FIG. 7B is a schematic diagram illustrating an example of alarm information received when a failure occurs according to an embodiment of the present invention;

FIGS. 9A and 9B are schematic diagrams illustrating an example of an operation performed by determining whether a main cause alarm has an effect on a related carrier according to an embodiment of the present invention;

FIGS. 10A and 10B are schematic diagrams illustrating an example of an operation performed by transmitting effect alarm information according to an embodiment of the present invention;

FIGS. 12A and 12B are schematic diagrams illustrating an example of an operation performed by determining a cause of a failure according to an embodiment of the present invention.

DESCRIPTION OF EMBODIMENTS

As described above, in a case where a carrier receives alarm information due to a failure occurring in a path span across plural different carriers, each of the carriers may need to determine whether the cause of the failure is due to the carrier itself or another carrier. However, there are cases where a carrier may be unable to make prompt determination (judgment) by only relying on alarm information owned by the carrier itself. Thus, the carrier is obliged to confirm abnormalities with another carrier. As a result, much time is consumed for investigating the cause and resolving (recovering from) the cause of the failure.

According to the below-described embodiment of a monitoring apparatus, a carrier can receive related alarm information from other carriers in a case where a failure occurs in a path span across plural carriers. Therefore, the carrier can quickly determine whether the cause of the failure is due to the carrier itself or another carrier. Thus, the carrier does not need to confirm information regarding the failure with other carriers. Accordingly, prompt and consistent action for recovering from the failure can be taken. As a result, the time between the occurrence of the failure and the recovery of the failure can be shortened.

In the following, embodiments of the present invention are described with reference to the accompanying drawings.

Figure 4:
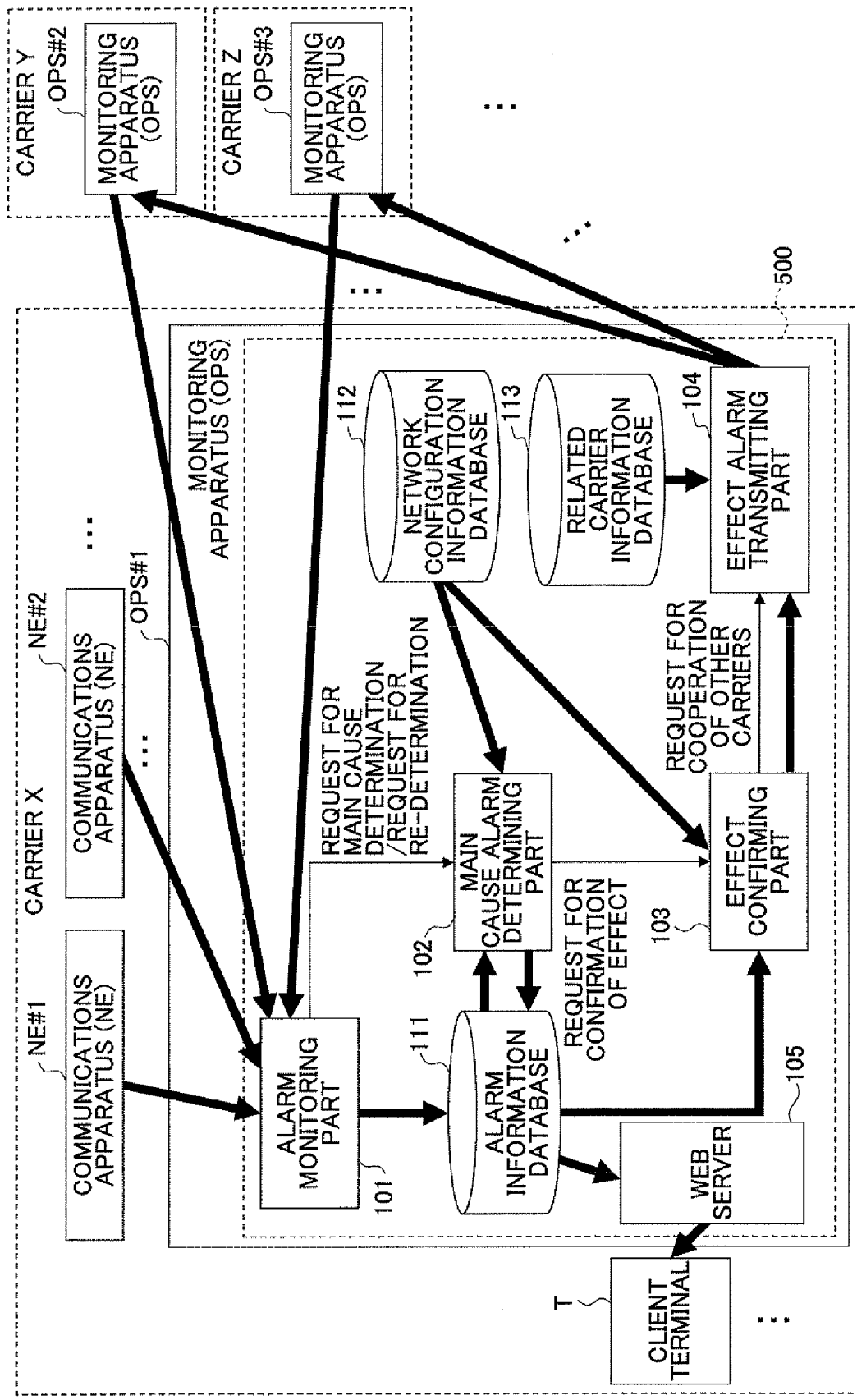
FIG. 4 is a schematic diagram illustrating a configuration of a system according to an embodiment of the present invention.

FIG. 4 illustrates an exemplary configuration of a system according to an embodiment of the present invention. Although an internal configuration of the monitoring apparatus OPS#1 of a carrier X is illustrated in FIG. 4, monitoring apparatuses OPS#2, OPS#3, . . . corresponding to other carriers Y, Z, . . . also have the same internal configuration.

The monitoring apparatus OPS#1 includes databases maintaining data used for performing various processes. In this embodiment, the monitoring apparatus OPS#1 includes an alarm information database 111, a network configuration information database 112, and a related carrier information database 113. These databases 111, 112, 113 systematically maintain data in a recording medium (e.g., HDD (Hard Disk Drive)) provided inside the monitoring apparatus OPS#1.

The alarm information database 111 maintains alarm information received from communications apparatuses NE#1, NE#2, . . . provided inside the carrier X itself and from other carriers Y, Z, . . . . The data structure includes fields corresponding to items included in the alarm information (e.g., generating location, generating apparatus, physical location, alarm information type) and fields for storing determination results (e.g., results of determining the main cause of failure).

The network configuration information database 112 maintains information regarding the configuration of the network inside the carrier X itself (network configuration information of the carrier X). The network configuration information database 112 includes section information and path information. In a case where one or more paths span across to another carrier(s), each path is assigned a unique related carrier path ID. That is, the path information contains related carrier path IDs allowing a path to be uniquely identified (distinguished) for determining which one of the paths spans across to the other carrier(s) and which of the carriers the path spans across to. The related carrier path ID is defined with the same ID among the related carriers.

The related carrier database 113 maintains information regarding other related carriers (e.g., destination (address) for transmitting alarm information) in correspondence with each of the related carrier path IDs.

The monitoring apparatus OPS#1 includes various function parts for performing various processes. In this embodiment, the monitoring apparatus OPS#1 includes an alarm monitoring part 101, a main cause alarm determining part 102, an effect determining part 103, an effect alarm transmitting part 104, and a Web server 105. These function parts 101-105 are operated by a computer program executed by a computer 500 of the monitoring apparatus OPS#1 including hardware resources such as CPU (Central Processing Unit), ROM (Read Only Memory), RAM (Random Access Memory). These function parts 101-105 not only can be provided in a single computer but may also be provided in plural computers.

The alarm monitoring part 101 includes functions of receiving alarm information from the communication apparatuses NE#1, NE#2, . . . provided in the carrier X itself and alarm information from other carriers Y, Z, . . . , and storing the received alarm information.

The main cause alarm determining part 102 includes functions of identifying (selecting) alarm information which indicate a main cause of a failure (main cause alarm) and identifying failure alarm information of all related carriers. That is, the main cause alarm determining part 102, which receives plural alarm information items from plural communications apparatuses when a failure occurs, includes the functions of comparing alarm generating locations and determining significance of the alarm contained in the received plural alarm information items by referring to the alarm information database 111 and the network configuration information database 112. The main cause alarm determining part 102 also includes a function of storing the determination results in the alarm information database 111. Further, when the main cause alarm determining part 102 receives alarm information from other carriers, the main cause alarm information determining part also has functions of comparing alarm generating locations and determining the significance of the alarm again based on total alarm information (information having combined alarm information received from the carrier X itself and alarm information received from other carriers) by referring to the alarm information database 111 and the network configuration information database 112. The main cause alarm determining part 102 also includes a function of storing the determination results in the alarm information database 111.

The effect confirming part 103 is for determining (confirming) whether generation of an alarm has an effect on other carriers. The effect confirming part 103 includes a function of confirming whether a related carrier path ID is assigned with respect to a location generating the main cause alarm identified by the main cause alarm determining part 102 or a location affected by generation of an alarm.

The effect alarm transmitting part 104 includes a function of cooperating (coordinating) only with respect to monitoring apparatuses affected by the generation of the alarm. In a case where the effect confirming part 103 determines that the generation of alarm has an effect on another related carrier(s), the effect alarm transmitting part 104 refers to the related carrier information database 113 and transmits main cause alarm information together with alarm information containing a related carrier path ID and a generating location to a monitoring apparatus of a corresponding related carrier(s).

The Web server 105 includes a function of providing information stored in the alarm information database 111 to a client terminal T operated by an administrator of the carrier X.

Figure 1:
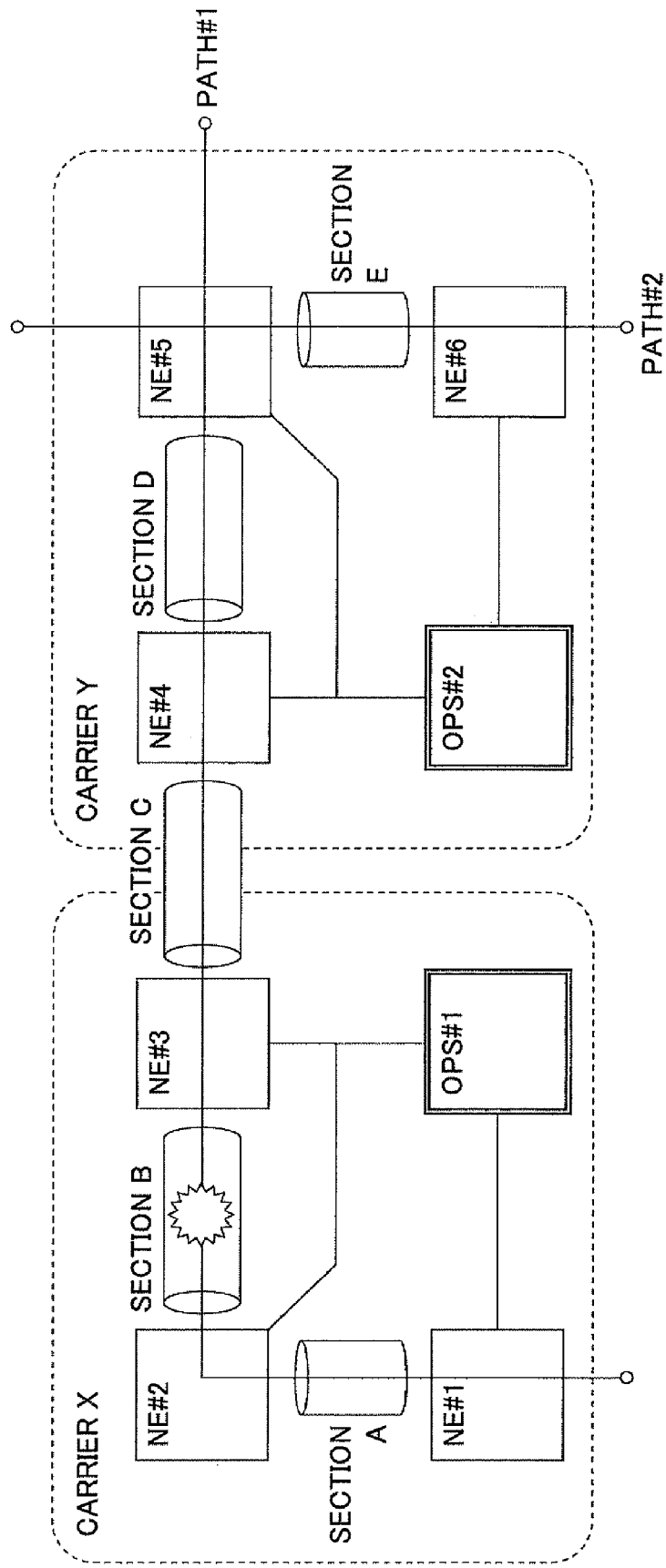
FIG. 1 is a schematic diagram for describing a path span across plural carriers.
Figure 2:
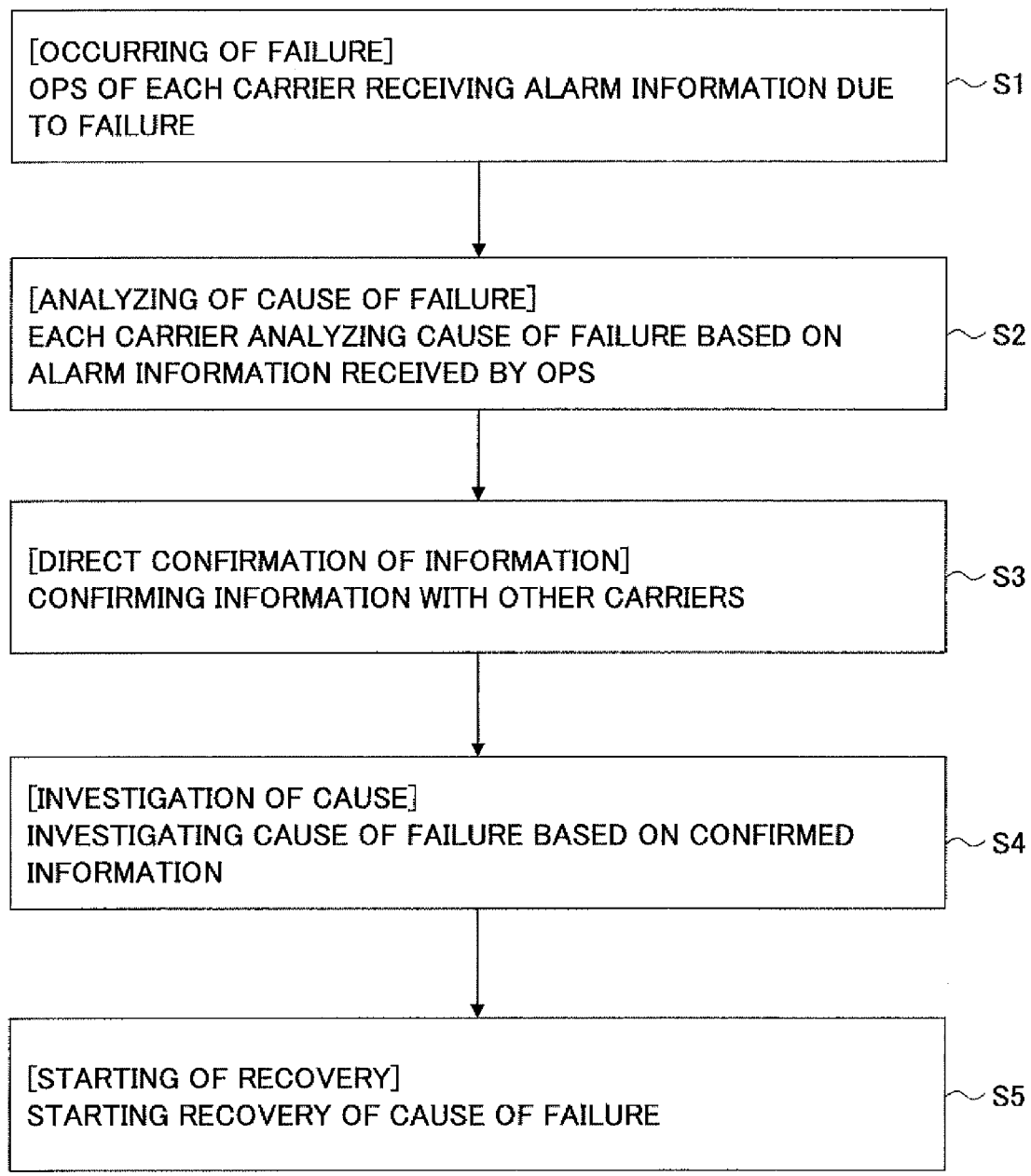
FIG. 2 is a flowchart illustrating procedures of responding to a failure according to a related art example.

FIG. 5 is a flowchart illustrating an example of an operation performed by monitoring apparatuses (OPS#1, OPS#2) according to an embodiment of the present invention. The following example describes a case where the carriers X and Y of FIG. 1 are connected. Further, this case is where a failure has occurred on the path #1 in section B on the path #1 inside the carrier X.

In FIG. 5, as a preliminary registration/management process, each of the carriers X, Y assigns a unique distinguishable related carrier path ID to path information (Step S11).

FIG. 6A illustrates an example of the network configuration information database 112. The section information in the network configuration information database 112 of the carrier X includes, for example, "ID (section ID)", "section name", "terminal apparatus 1", "physical location 1", "terminal apparatus 2", and "physical location 2" corresponding to each section (in FIG. 6A, Sections A, B, C). The path information in the network configuration information database 112 of the carrier X includes, for example, "ID (path ID)", "path name", "terminal apparatus 1", "physical location 1", "terminal apparatus 2", "physical location 2", "section ID", "CH (channel)", . . . , "section ID", "CH", and "related carrier path ID" corresponding to each path (in FIG. 6A, Path#1). In FIG. 6A, the terminal apparatus for Section C is indicated as "NE#other" because the terminal apparatus for Section C is located in another carrier. In FIG. 6A, the physical location for Section C is blank.

Further, the section information in the network configuration information database 112 of the carrier Y includes, for example, "ID (section ID)", "section name", "terminal apparatus 1", "physical location 1", "terminal apparatus 2", and "physical location 2" corresponding to each section (in FIG. 6A, Sections D, C, E). The path information in the network configuration information database 112 of the carrier Y includes, for example, "ID (path ID)", "path name", "terminal apparatus 1", "physical location 1", "terminal apparatus 2", "physical location 2", "section ID", "CH (channel)", . . . , "section ID", "CH", and "related carrier path ID" corresponding to each path (in FIG. 6A, Path#1, Path#2). Likewise, in FIG. 6A, the terminal apparatus for Section C is indicated as "NE#other" because the terminal apparatus for Section C is located in another carrier. In FIG. 6A, the physical location for Section C is blank.

Because the path #1 spans across to the carriers X and Y, the path #1 included in the path information of both the carrier X and Y is assigned the same related carrier path ID "001". Further, since the path #2 does not span between the carriers X and Y, no related carrier path ID is assigned to the path #2 included in the path information of the carrier Y.

Meanwhile, related carrier information illustrated in FIG. 6B is set to the related carrier information database 113. That is, in the related carrier information database 113 of the carrier X, "related carrier 1: carrier Y" and "transmission destination: xx.xx.xx.xx" are set in correspondence with "related carrier path ID: 001". Further, in the related carrier information database 113 of the carrier Y, "related carrier 1: carrier X" and "transmission destination: xx.xx.xx.xx" are set in correspondence with "related carrier path ID: 001".

Returning to FIG. 5, in a case where a failure occurs, the monitoring apparatuses OPS#1, OPS#2 of the carriers X, Y receive alarm information due to the failure (Step S12). The reception of the alarm information is performed by the alarm monitoring part 101. The alarm monitoring part 101 stores the received alarm information in the alarm information database 111.

FIG. 7A illustrates an example of alarm information received by the monitoring apparatus OPS#1 of the carrier X when a failure occurs, and FIG. 7B illustrates an example of alarm information received by the monitoring apparatus OPS#2 of the carrier Y when a failure occurs. As illustrated in FIG. 7A, the monitoring apparatus OPS#1 of the carrier X receives, for example, "generating location: path #1", "generating apparatus: NE#1", "physical location: 1-1-1", and "alarm type: AIS", "generating location". Because the received alarm information is alarm information generated from an area managed by each of the respective carriers X, Y, respectively, alarm generating status of related carriers (other carriers) or whether the main cause of failure is in the related carriers cannot yet be determined at this stage.

Returning to FIG. 5, the monitoring apparatuses OPS#1, OPS#2 of each carrier X, Y determines whether the received alarm information is main cause alarm information by using the main cause alarm determining part 102 (Step S13). That is, the main cause alarm determining part 102 determines which of the received alarm information items corresponds to main cause alarm information.

Figure 8A:
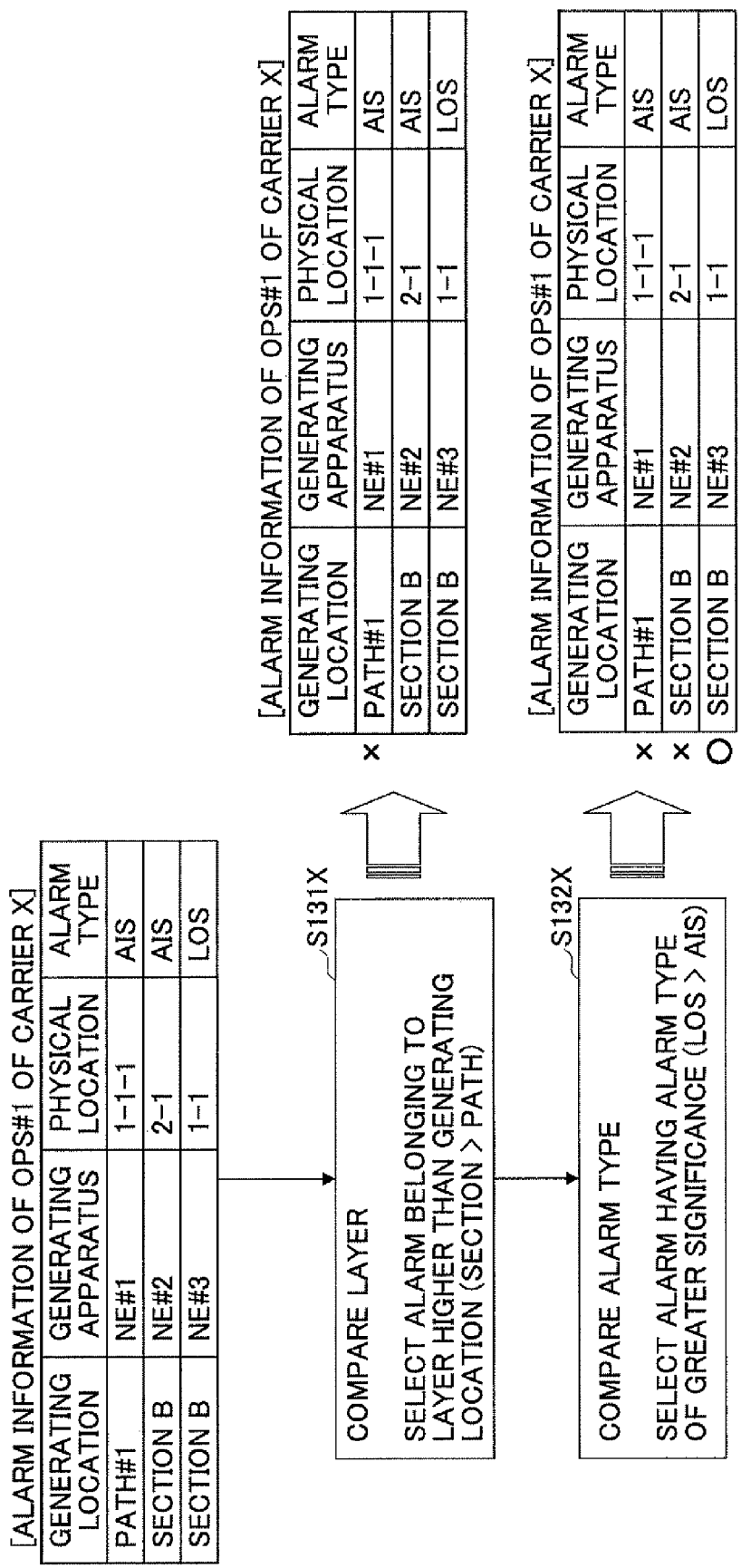
FIGS. 8A and 8B are schematic diagrams illustrating an example of an operation performed by determining a main cause alarm according to an embodiment of the present invention.
Figure 8B:
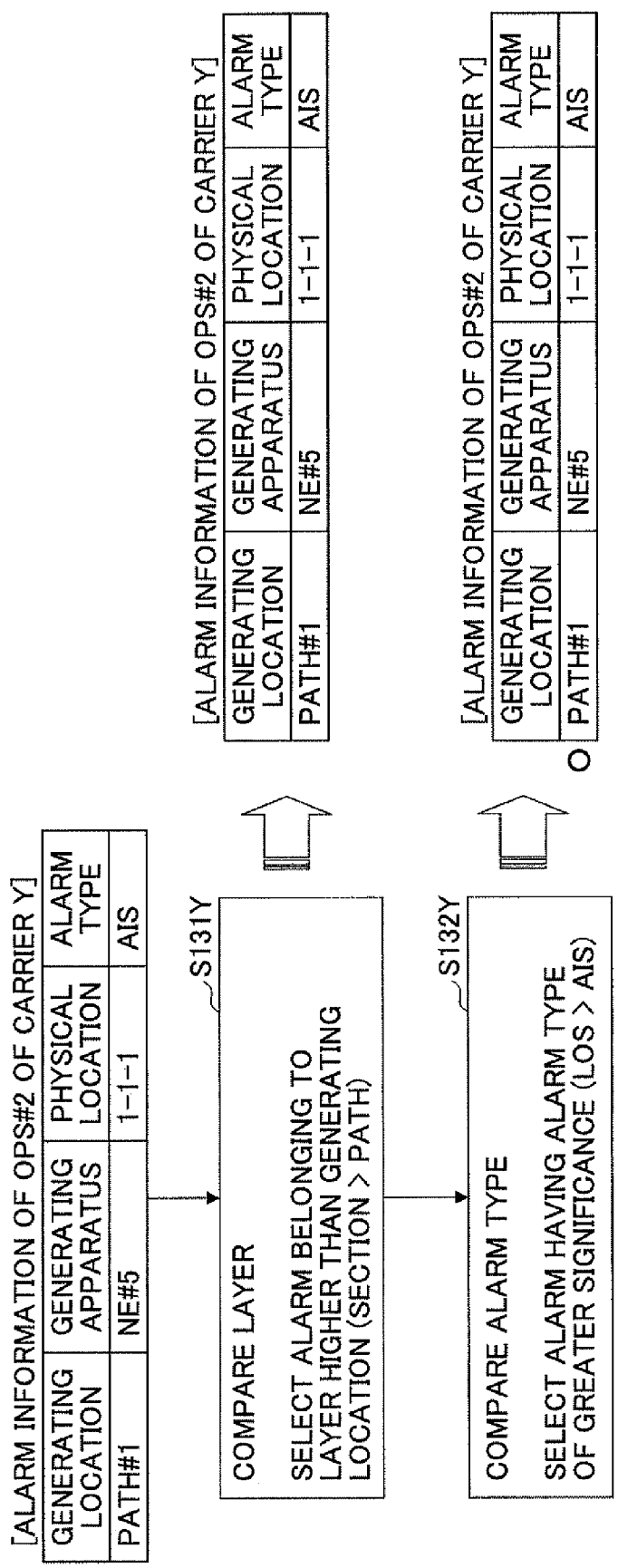

FIGS. 8A and 8B are schematic diagrams for describing an operation for determining the main cause alarm. With reference to FIG. 8A, first, the main cause alarm determining part 102 of the monitoring apparatus OPS#1 of the carrier X selects an alarm generated at the highest layer among the received alarm information (Step S131X). In this example, in the carrier X, the main cause alarm determining part 102 determines that the alarm generated at the path #1 is not the main cause alarm because the path #1 is located at a layer lower than the section B (marked with an "X" in FIG. 8A).

Then, the main cause alarm determining part 102 of the monitoring apparatus OPS#1 of the carrier X selects alarm information having a higher significance (failure level) in a case where alarm information items are of the same layer (Step S132X). In this example, the main cause alarm determining part 102, receiving AIS type alarm information and LOS type alarm information corresponding to the section B, determines that the LOS type alarm information is the main cause alarm (marked with a "O" in FIG. 8A) rather than the AIS type alarm information (marked with an "X" in FIG. 8A) because the LOS type alarm information has greater significance than the AIS type alarm information.

Likewise, with reference to FIG. 8B, first, the main cause alarm determining part 102 of the monitoring apparatus OPS#2 of the carrier Y selects an alarm generated at the highest layer among the received alarm information items (Step S131Y). Further, the main cause alarm determining part 102 of the monitoring apparatus OPS#2 of the carrier Y selects alarm information having a higher significance (failure level) in a case where alarm information items are of the same layer (Step S132Y). In this example, in the carrier Y, the main cause alarm determining part 102, receiving only the alarm information corresponding to path #1, determines that the receive alarm information of path #1 is the main cause alarm (marked with a "O" in FIG. 8B)

Returning to FIG. 5, in the monitoring apparatuses OPS#1, OPS#2 of the respective carriers X, Y, the effect confirming part 103 in each of the monitoring apparatuses OPS#1, OPS#2 determines whether the main cause alarm has any effect on other related carriers by referring to the main cause alarm information determined by the main cause alarm determining part 102 and the information managed in the network configuration information database 112 (Step S14). That is, the effect confirming part 103 determines whether the determined main cause alarm affects other related carriers by referring to a location from which the main cause alarm is generated (generating location), whether a related carrier path ID is assigned to the generating location, and whether a related carrier path ID is assigned to a location which the main cause alarm affects.

FIGS. 9A and 9B are schematic diagrams for describing an exemplary operation for determining (confirming) effect on other related carriers. With reference to FIG. 9A, first, the effect confirming part 103 of the monitoring apparatus OPS#1 of the carrier X identifies the location generating a main cause alarm by referring to the generating location indicated in the main cause alarm information (Step S141X). In this example, Section B is identified as the generating location of the main cause alarm.

Then, the effect confirming part 103 of the monitoring apparatus OPS#1 of the carrier X determines whether a related carrier path ID is assigned to the generating location (Step S142X). In this example, the effect confirming part 103 refers to the section information corresponding to Section B and determines that the main cause alarm has no direct effect on other related carriers because no related carrier path ID is assigned to the section information corresponding to Section B.

Then, the effect confirming part 103 of the monitoring apparatus OPS#1 of the carrier X determines whether a related carrier path ID is assigned to a location affected by the generating location (i.e. a layer affected by the location generating the main cause alarm) (Step S143X). In this example, the effect confirming part 103 determines that the path #1 including a section ID "2" of Section B is the location affecting other related carrier(s) according to the path information of the monitoring apparatus OPS#1 because a related carrier path ID "001" is assigned to the path information corresponding to path #1.

Likewise, with reference to FIG. 9B, first, the effect confirming part 103 of the monitoring apparatus OPS#1 of the carrier Y identifies the location generating a main cause alarm by referring to the generating location indicated in the main cause alarm information (Step S141Y). In this example, path #1 is identified as the generating location of the main cause alarm.

Then, the effect confirming part 103 of the monitoring apparatus OPS#1 of the carrier Y determines whether a related carrier path ID is assigned to the generating location (Step S142Y). In this example, the effect confirming part 103 refers to the path information corresponding to path #1 and determines that the main cause alarm affects other related carriers because a related carrier path ID [001] is assigned to the path information corresponding to path #1.

Then, the effect confirming part 103 of the monitoring apparatus OPS#2 of the carrier Y determines whether a related carrier path ID is assigned to a location affected by the generating location (i.e. a layer affected by the location generating the main cause alarm) (Step S143Y). In this example, the effect confirming part 103 does not need to determine whether a related carrier path ID is assigned to a location affected by the generating location considering that no layer lower than the path #1 exists and that a lower layer has no effect on an upper layer.

Returning to FIG. 5, in a case where a related carrier path ID is assigned to a generating location or a location affected by the generating location, the effect alarm transmitting part 104 in each of the monitoring apparatuses OPS#1, OPS#2 of the respective carriers X, Y transmits alarm information to a corresponding monitoring apparatus of an affected carrier (Step S15). That is, each carrier transmits main cause alarm information, having an effect (i.e. affecting) on a related carrier together with information indicating a related carrier path ID and information indicating a layer generating the main cause alarm, to the affected carrier. The alarm monitoring part 101 in each of monitoring apparatuses OPS#1, OPS#2 of the respective carriers X, Y receive alarm information transmitted from another related carrier and stores the received alarm information in its alarm information database 111.

FIG. 10A illustrates examples of alarm information transmitted from the monitoring apparatus OPS#1 of the carrier X and alarm information transmitted from the monitoring apparatus OPS#2 of the carrier Y. In this example, the alarm information transmitted from the monitoring apparatus OPS#1 of the carrier X includes "generating layer: section", "alarm type: LOS", and "related carrier path ID: 001". Further, the alarm information transmitted from the monitoring apparatus OPS#2 of the carrier Y includes "generating layer: path", "alarm type: AIS", and "related carrier path ID: 001".

FIG. 10B illustrates examples of combined alarm information that combines alarm information received from a communications apparatus within the carrier itself and alarm information received from other related carriers. In FIG. 10B, the generating apparatus may be indicated as "other apparatus" where the generating apparatus (apparatus generating the alarm information) is located in another carrier and its physical address may be indicated with a blank.

Returning to FIG. 5, the main cause alarm determining part 102 in each of the monitoring apparatuses OPS#1, OPS#2 of the respective carriers X, Y determines the main cause alarm again based on newly received alarm information including the effect alarm information (Step S16).

Figure 11A:
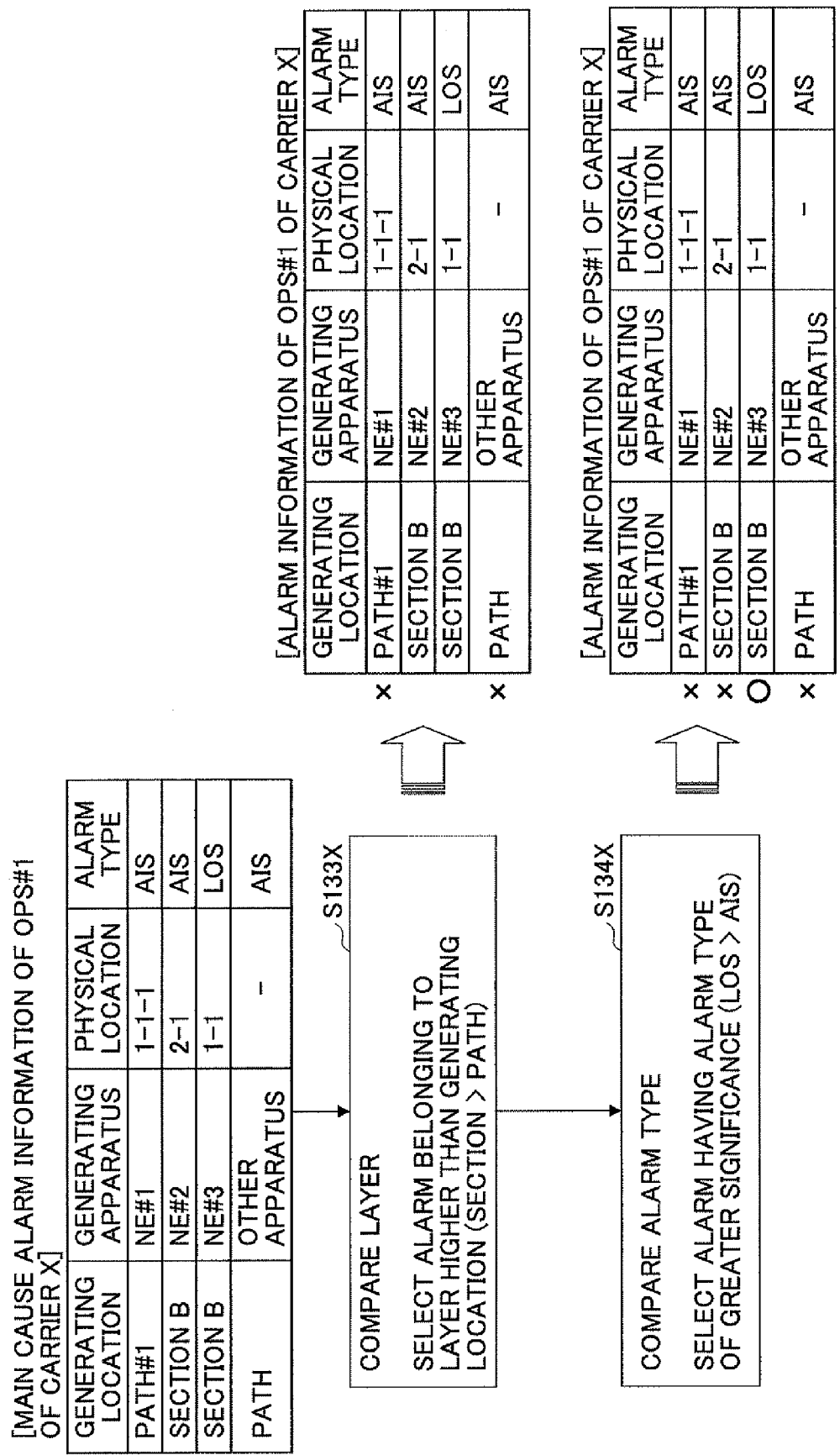
FIGS. 11A and 11B are schematic diagrams illustrating an example of an operation performed by determining alarm information (re-determining) according to an embodiment of the present invention.
Figure 11B:
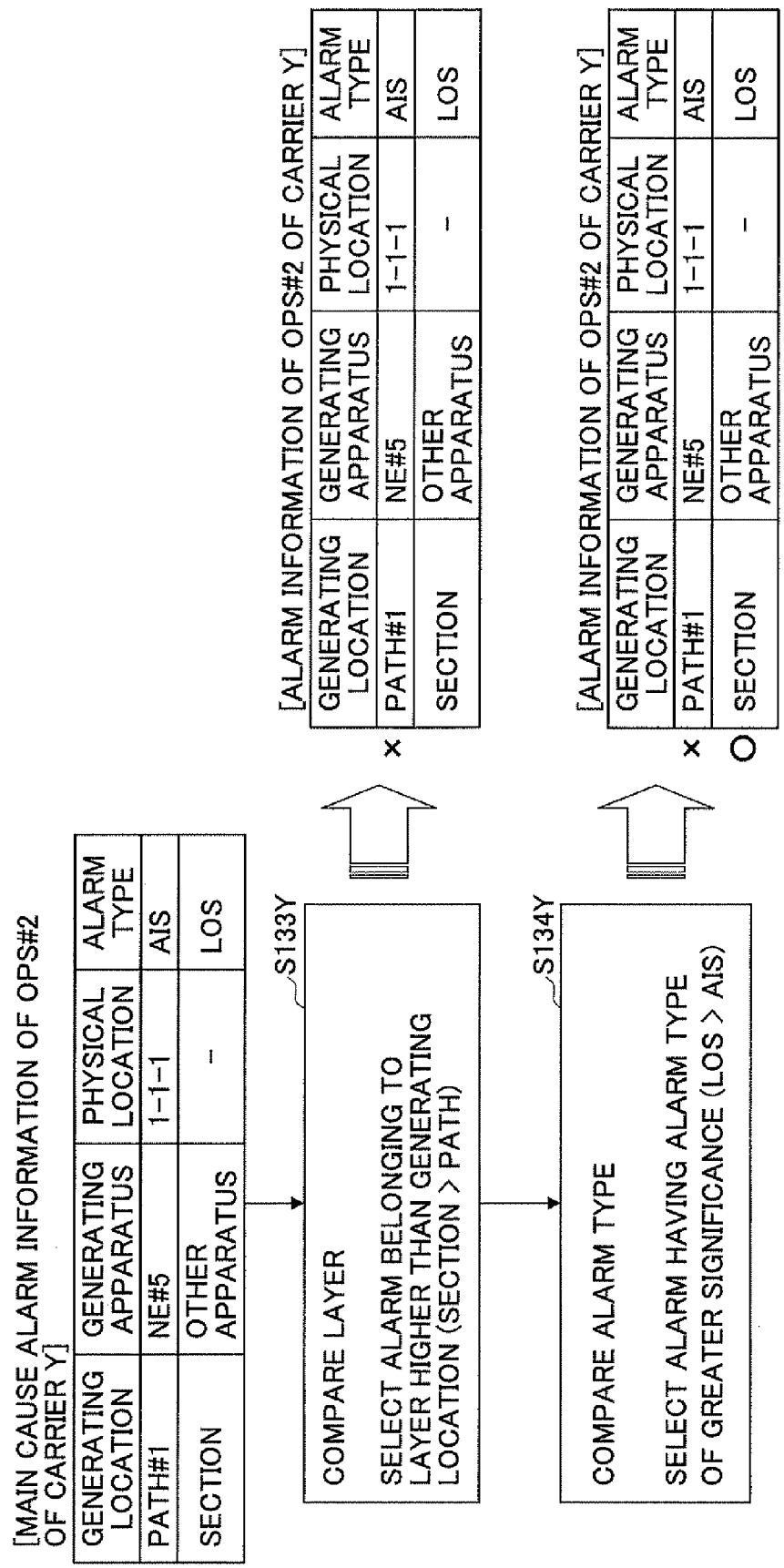

FIGS. 11A and 11B are schematic diagrams for describing an exemplary operation for determining (re-determining) the main cause alarm. Although the operation illustrated in FIGS. 11A and 11B is substantially the same as that illustrated with FIGS. 8A and 8B, the determination result may be different since new information is added to the alarm information subject to determination.

As illustrated in FIG. 11A, the main cause alarm determining part 102 of the carrier X selects alarm information generated in the highest layer (Step S133X). Thus, the main cause alarm determining part 102 determines that alarm information "generating location: path #1", "generating apparatus: NE#1", "generating location: path", and "generating apparatus: other apparatus" are not main cause alarm information (marked with "X" in FIG. 11A).

Then, the main cause alarm determining part 102 of the carrier X selects alarm information indicating an alarm having the highest significance (failure level) (Step S134X). Thus, the main cause alarm determining part 102 determines that alarm information "generating location: Section B", "generating apparatus: NE#2" are not main cause alarm information (marked with "X" in FIG. 11A) and determines that alarm information "generating location: Section B", "generating apparatus: NE#3" are main cause alarm information (marked with "O" in FIG. 11A).

As illustrated in FIG. 11B, the main cause alarm determining part 102 of the carrier Y selects alarm information generated in the highest layer (Step S133Y). Thus, the main cause alarm determining part 102 determines that alarm information "generating location: path #1", "generating apparatus: NE#5" are not main cause alarm information (marked with "X" in FIG. 11B).

Then, the main cause alarm determining part 102 of the carrier Y selects alarm information indicating an alarm having the highest significance (failure level) (Step S134Y). Thus, the main cause alarm determining part 102 determines that alarm information "generating location: Section", "generating apparatus: other apparatus" are main cause alarm information (marked with "O" in FIG. 11B).

In this example, although the main cause alarm of the carrier X remains the same even where the new alarm information is added, the main cause alarm of the carrier Y has the LOS alarm generated in the section (Section B) of the other carrier determined to be the main cause alarm.

Returning to FIG. 5, an administrator of each of the carriers X, Y confirms the cause of the failure according to the main cause alarm determined by corresponding main cause determining parts 112 (Step S17). That is, according to the results of the re-determination of the main cause alarm, the administrator of each of the carriers X, Y can confirm the location of the cause of the failure.

Figure 12A:
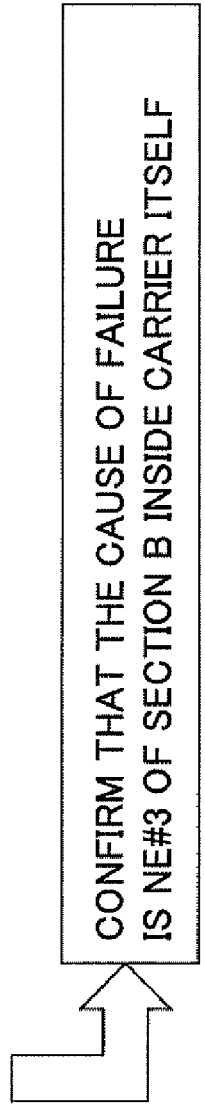

FIGS. 12A and 12B are schematic diagrams for describing an exemplary operation for confirming the cause of failure. As illustrated in FIG. 12A, the administrator of the carrier X can confirm that the communications apparatus NE#3 of Section B in the carrier X itself is the main cause of the failure. Further, the administrator of the carrier Y can confirm that a section layer of another related carrier is the cause of the failure.

Returning to FIG. 5, each of the administrators of the carriers X, Y can start performing a recovery operation on the cause of the failure (Step S18).

With the above-described embodiment of the present invention, the following advantages can be attained.

(1) Because automatic coordination of alarm information between different carriers can be performed, there is no need for administrators of the different carriers to confirm the status of failure by communicating with each other by telephone or the like. Thus, the workload of calling each other by telephone or the like can be eliminated and the time for starting a recovery operation can be shortened.

(2) Since only alarm information regarded to be main cause alarm information is automatically reported rather than all of the alarm information that the administrator of the carrier is aware of, it becomes easier for the administrator of the carrier to grasp the cause of the failure. Thus, the workload for grasping the cause of the failure can be reduced and the time for starting a recovery operation can be shortened.

(3) Since determination of the main cause alarm is performed again based on alarm information automatically reported from other carriers, it becomes easier to grasp the cause of the failure. Thus, the workload for grasping the cause of the failure can be reduced and the time for starting a recovery operation can be shortened.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

The invention claimed is:

1. A monitoring apparatus of a carrier, the monitoring apparatus comprising:
    a storage device that stores a plurality of function parts, including
        a managing part that assigns a related carrier path ID to network configuration information and manages the related carrier path ID, the related carrier path ID uniquely defining a path spanning between the carrier and a related carrier,
        a receiving part that receives a plurality of alarm information from a plurality of communications apparatuses in the carrier,
        a selecting part that selects main cause alarm information from the plurality of alarm information from the plurality of communications apparatuses in the carrier,
        a determining part that determines whether the main cause alarm information selected by the selecting part affects the related carrier by determining whether the related carrier path ID is assigned to corresponding network configuration information in the main cause alarm information, and
        a transmitting part that transmits the main cause alarm information including the related carrier path ID and a generating location to the related carrier where the main cause alarm information is determined to affect the related carrier; and
    a processor for executing the plurality of function parts.

2. The monitoring apparatus as claimed in claim 1, wherein the managing part is configured to maintain the network configuration information, wherein the network configuration information includes section information indicating information regarding one or more sections which constitute the path and path information indicating information regarding the path.

3. The monitoring apparatus as claimed in claim 1, further comprising:
    an alarm receiving part that receives alarm information transmitted from a monitoring apparatus of the related carrier; and
    a second selecting part that selects second main cause alarm information from a combination of alarm information including the plurality of alarm information received from the plurality of communications apparatuses and the alarm information transmitted from the related carrier.

4. The monitoring apparatus as claimed in claim 1, wherein the selecting part is configured to select the main cause alarm information from the plurality of alarm information by comparing alarm generating locations and alarm significances included in the alarm information received from the plurality of communications apparatuses.

5. The monitoring apparatus as claimed in claim 1, wherein the determining part is configured to determine whether the failure has an effect on the related carrier by determining whether the related carrier path ID is assigned to the generating location or the affected location.

6. The monitoring apparatus as claimed in claim 1, wherein the transmitting part is configured to transmit the alarm information to the related carrier based on transmission destination information of the related carrier.

7. A method of monitoring by a carrier, comprising:
    assigning a related carrier path ID to network configuration information and managing the related carrier path ID, the related carrier path ID uniquely defining a path spanning between the carrier and a related carrier;
    receiving a plurality of alarm information from a plurality of communications apparatuses in the carrier;
    selecting main cause alarm information from the plurality of alarm information from the plurality of communications apparatuses in the carrier;
    determining whether the main cause alarm information selected by the selecting affects the related carrier by determining whether the related carrier path ID is assigned to corresponding network configuration information in the main cause alarm information; and
    transmitting the main cause alarm information including the related carrier path ID and a generating location to the related carrier where the main cause alarm information is determined to affect the related carrier.

8. The method as claimed in claim 7, wherein the managing includes maintaining the network configuration information, wherein the network configuration information includes section information indicating information regarding one or more sections which constitute the path and path information indicating information regarding the path.

9. The method as claimed in claim 7, further comprising:
    receiving alarm information transmitted from a monitoring apparatus of the related carrier; and
    selecting second main cause alarm information from a combination of alarm information including the plurality of alarm information received from the plurality of communications apparatuses and the alarm information transmitted from the related carrier.

10. The method as claimed in claim 7, wherein the selecting includes selecting the main cause alarm information from the plurality of alarm information by comparing alarm generating locations and alarm significances included in the alarm information received from the plurality of communications apparatuses.

11. The method as claimed in claim 7, wherein the determining includes determining whether the failure has an effect on the related carrier by determining whether the related carrier path ID is assigned to the generating location or the affected location.

12. The method as claimed in claim 7, wherein the transmitting includes transmitting the alarm information to the related carrier based on transmission destination information of the related carrier.

* * * * *